United States Patent
Hinderthür

(10) Patent No.: US 8,824,893 B2
(45) Date of Patent: Sep. 2, 2014

(54) MESHED PROTECTED PASSIVE OPTICAL ACCESS NETWORK STRUCTURE AND OPTICAL NETWORK UNIT STRUCTURE THEREFORE

(71) Applicant: ADVA Optical Networking SE, Meiningen (DE)

(72) Inventor: Henning Hinderthür, Finning (DE)

(73) Assignee: ADVA Optical Networking SE, Meiningen (DE)

( * ) Notice: Subject to any disclaimer, the term of this patent is extended or adjusted under 35 U.S.C. 154(b) by 70 days.

(21) Appl. No.: 13/680,698

(22) Filed: Nov. 19, 2012

(65) Prior Publication Data

US 2013/0136448 A1  May 30, 2013

(30) Foreign Application Priority Data

Nov. 25, 2011 (EP) .................................... 11401642

(51) Int. Cl.
H04J 14/02 (2006.01)
H04B 10/272 (2013.01)
H04J 14/08 (2006.01)

(52) U.S. Cl.
CPC .......... *H04B 10/272* (2013.01); *H04J 14/0216* (2013.01); *H04J 14/0284* (2013.01); *H04J 14/0205* (2013.01); *H04J 14/0206* (2013.01); *H04J 14/028* (2013.01); *H04J 14/022* (2013.01); *H04J 14/0204* (2013.01); *H04J 14/0294* (2013.01); *H04J 14/0282* (2013.01); *H04J 14/086* (2013.01)
USPC ................... 398/83; 398/79; 398/63; 398/75; 398/98

(58) Field of Classification Search
CPC .............. H04J 14/0284; H04J 14/0212; H04J 14/0241; H04J 14/0283; H04J 14/0204; H04J 14/0216; H04J 14/0201; H04Q 2011/0033; H04B 10/032; H04B 10/272
USPC .......... 398/83, 79, 82, 63, 67, 98, 75, 100, 99
See application file for complete search history.

(56) References Cited

U.S. PATENT DOCUMENTS

| | | | |
|---|---|---|---|
| 6,721,505 B2 * | 4/2004 | Talbot ............................ | 398/59 |
| 6,973,267 B1 * | 12/2005 | Arecco et al. ...................... | 398/4 |
| 7,206,508 B2 * | 4/2007 | Sharma et al. .................... | 398/4 |
| 7,764,883 B2 * | 7/2010 | Hinderthur ..................... | 398/50 |
| 8,090,256 B2 * | 1/2012 | Reisslein et al. .................. | 398/3 |
| 8,213,790 B2 * | 7/2012 | Hinderthur ........................ | 398/5 |
| 8,249,453 B2 * | 8/2012 | Takita et al. .................... | 398/68 |
| 8,280,249 B2 * | 10/2012 | Friedrich et al. ................ | 398/33 |

(Continued)

*Primary Examiner* — Daniel Washburn
*Assistant Examiner* — Hibret Woldekidan
(74) *Attorney, Agent, or Firm* — The Culbertson Group, P.C.

(57) ABSTRACT

Provided is an optical network system and optical network unit (ONU) structure enabling a passive optical access network having a meshed structure with at least two central nodes and plurality of ONUs. One embodiment employs a partially or fully meshed structure of optical fibers between customer locations and multiple optical line terminal (OLT) locations creating a passive optical access network. The ONUs can communicate with a neighboring OLT or ONU using a symmetrical or asymmetrical TDM scheme, and convert between the different TDM schemes. For this purpose, the ONU structure includes two transceiver units, one connected to the western network port and the other to the eastern. The ONU can establish communication between either network port and a further ONU or an OLT, with the ONU controller adapted for passing through data, and converting TDM schemes.

11 Claims, 5 Drawing Sheets

(56) References Cited

U.S. PATENT DOCUMENTS

| | | | | |
|---|---|---|---|---|
| 8,300,659 | B2* | 10/2012 | Hinderthuer | 370/466 |
| 8,406,636 | B2* | 3/2013 | Zou | 398/167 |
| 8,705,955 | B2* | 4/2014 | Grobe et al. | 398/16 |
| 2003/0215238 | A1* | 11/2003 | Milton et al. | 398/83 |
| 2005/0084267 | A1* | 4/2005 | Fan et al. | 398/84 |
| 2006/0210273 | A1* | 9/2006 | Gumaste et al. | 398/83 |
| 2006/0210274 | A1* | 9/2006 | Lichtman et al. | 398/83 |
| 2009/0074403 | A1* | 3/2009 | Chi et al. | 398/3 |
| 2009/0154930 | A1* | 6/2009 | Hinderthuer | 398/83 |
| 2009/0245797 | A1* | 10/2009 | Tsurumi et al. | 398/79 |
| 2010/0046941 | A1* | 2/2010 | Stadler | 398/25 |
| 2010/0209106 | A1* | 8/2010 | Sugawara | 398/59 |
| 2010/0239243 | A1* | 9/2010 | Zheng | 398/4 |
| 2013/0272701 | A1* | 10/2013 | Kuri | 398/45 |

* cited by examiner

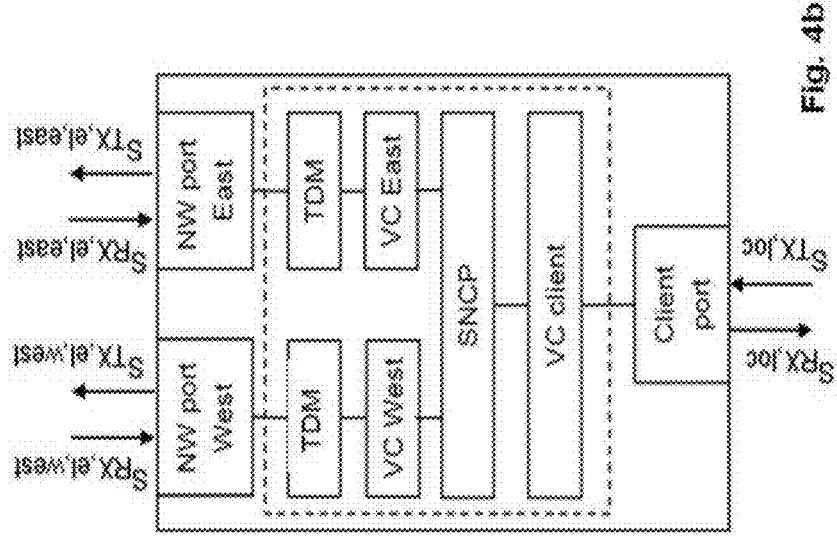
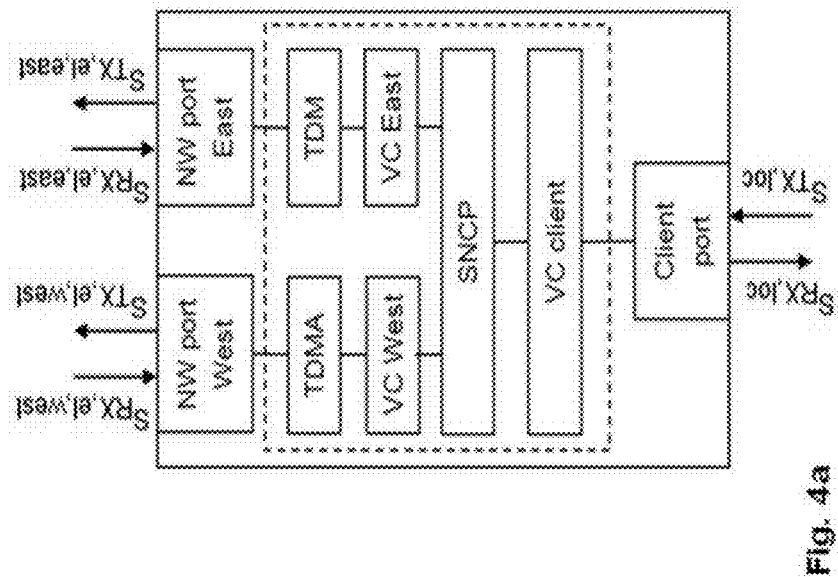

MESHED PROTECTED PASSIVE OPTICAL ACCESS NETWORK STRUCTURE AND OPTICAL NETWORK UNIT STRUCTURE THEREFORE

FIELD OF THE INVENTION

The invention relates to an optical network unit structure for a passive optical access network having a meshed structure consisting of at least two central nodes and a plurality of optical network units and to a passive optical access network structure using respective optical network units.

BACKGROUND

Optical access networks are usually realized as passive optical networks (PONs). In a PON, a plurality of optical network units (ONUs) is connected to a central node, often referred to as optical line terminal (OLT), often via one or more remote nodes (RN), which comprise passive optical components only. Usually, each ONU is coupled to an RN via a single optical fiber that is used for bidirectional optical communication between the respective ONU and the OLT. For this structure of an optical access network, it is known to use an optical wavelength division multiplex (WDM) signal in the transmission path between the OLT and the respective RN or all RNs. If the RNs are connected via an optical bus or ring structure, each RN may be realized as a passive optical add/drop multiplexer adapted to extract from and add to the optical WDM signal the respective optical channel signal. In the simplest case, each optical channel signal included in the optical WDM signal may be used for establishing a bidirectional communication between an ONU and the OLT.

Of course, if the optical channel signal at a port of the RN is a time division multiplex (TDM) signal, the TDM signal may be supplied to a plurality of ONUs which are connected to the respective RN via a star structure. This structure or substructure may be realized by using a passive optical splitter or star coupler equally dividing the optical TDM (channel) signal and feeding each of the divided signals to an ONU. In this case, an asymmetrical TDM scheme must be applied as only one ONU may transmit at the same time. As each transmitter unit in an ONU must be silent at times outside of a dedicated time slot (within the asymmetrical TDM signal), it is necessary to turn the laser (or other optical transmitting element) on and off very quickly. This requires expensive active optical components (especially lasers) with extremely low transient times. In such a star structure, the simplest way of providing protection against a single point of failure, e.g. a fiber break between an ONU and the RN, is to connect the ONU to the RN via an additional fiber. However, this duplication of the transmission medium as well as the necessary parts of the RN and ONU causes a disadvantageous redundancy of resources.

European Patent Application No. EP 1746857 A1 discloses a linear bus structure for a PON comprising two OLTs, each OLT connected to the end of a linear bus or chain-like structure of ONUs. The OLTs may be present at the same location so that, in this case, the linear structure becomes an open-ring structure. In both cases, it is proposed to use specific optical coupling/decoupling means having three ports, two of which are used to connect the optical fibers between two neighboring ONUs or between an ONU and a neighboring OLT and the third for connecting the respective ONU. Here, the plurality of three-port coupling means may be considered a distributed RN. In such linear or chain-like PON structures, a symmetric TDM scheme may be used, i.e., the ONU and the OLT may use a dedicated time slot of the TDM scheme to transmit their data.

In practice, customer locations, at which ONUs are necessary, are often connected to the location of an OLT and/or to one or more other customer ONU locations simultaneously using a single optical fiber connecting the respective two locations.

SUMMARY OF THE INVENTION

The invention generally provides an advantageous way to use these existing partially or fully meshed structures to build up a PON or PON structures. It is one object of the present invention to provide an optical network unit structure that makes it possible to build up a passive optical access network having a meshed structure consisting of at least two central nodes and plurality of optical network units. It is a further object of the invention to provide a passive optical access network structure using respective optical network units.

One embodiment employs a partially or fully meshed structure of optical fibers between a plurality of customer locations and at least two OLT locations to build up a passive optical access network using an optical network unit structure for realizing an ONU that is able to communicate with a neighboring OLT or ONU using either a symmetrical or an asymmetrical TDM scheme applied signals received at or transmitted from a western or eastern network port. The different TDM schemes may be converted one into the other by the optical network unit. In order to assure this, the optical network unit structure provided herein includes two transceiver units (each including a transmitter unit and a receiver unit), one being connected to the western network port and the other one being connected to the eastern network port. The ONU is capable of establishing a communication between either of the network ports and a further ONU or an OLT. The ONU is further capable of passing through the data received at one network port to the respective other network port. As for this purpose, the optical TDM signal received at the respective network port (by the receiver unit of the respective transceiver unit) is processed by the control unit of the ONU in order to extract the data to be passed through and integrated into the optical TDM signal that is output at the respective other network port (by the transmitter unit of the respective other transceiver unit). It is also possible to use different TDM schemes for the TDM signal received and the TDM signal transmitted.

It is thus possible to build up a passive optical access network structure using such optical network units which reveal sections having a straight star structure and sections having a straight linear or chain-like structure. The borders between the sections are realized by an ONU of this structure that belongs to both sections (or, expressed in other words, one half of the ONU structure including the respective transceiver unit belongs to one section and the other half including the other transceiver unit belongs to the other section, the connection between the two sections being effected by the control unit of the ONU structure).

The ONU may establish a bidirectional transmission between the at least one local port and a further network unit (which may be an OLT or a remote ONU) using a TDM signal of a suitable scheme either via the western or the eastern network port. If the transmission path that has been chosen as a working path is interrupted, the control unit may establish a communication to the same network unit via the other network port using a suitable protection path.

The optical network unit structure to be employed in such a network structure is provided as a simple structure that can be realized at rather low costs, and may be used in network topologies having a straight star or linear structure as well as in meshed structures consisting of star and linear substructures.

The control unit may be manually switched with respect to the TDM scheme to be applied for communicating via the eastern and western network ports. Of course, the information which TDM scheme is to be applied for the communication via the western and/or via the eastern network port may also be determined in an initialization process for the ONU or transmitted to the ONU from a higher order network unit.

According to an embodiment of the invention, the control unit uses network topology information to decide which TDM scheme is to be applied for the communication via the western and/or via the eastern network port.

The control unit may include a storage area adapted to store the network topology information, the network topology information at least including information whether at least one of the western and the eastern network ports is directly connected to a port of a passive optical star coupling means or to a network port of a further optical network unit.

The control unit may then apply a symmetrical TDM scheme for processing the signals received from and transmitted via the respective eastern or western network port, if the respective network port is directly connected to a port of a passive optical star coupling means, and apply an asymmetrical TDM scheme for processing the signals received from and transmitted via the respective eastern or western network port, if the respective network port is directly connected to a network port of a further optical network unit.

According to a preferred embodiment, the eastern and/or western network port is adapted to connect with a single optical fiber that is used for the bidirectional communication.

In this case, in a first alternative, the optical receive signal and the optical transmit signal use the same optical carrier wavelength. In order to separate the paths for the receive signal and the transmit signal, the network port may be connected to a first port of an optical circulator. An output port of the respective transmitter unit may be connected to a second port of the optical circulator, and an input port of the respective receiver unit may be connected to a third port of the optical circulator. In this way, the optical circulator makes it possible to separate the common input/output path defined by the single optical fiber into an input path between the third port of the optical circulator and the input port of the respective receiver unit and an output path between the output port of the respective transmitter unit and the second port of the optical circulator.

In a second alternative, the optical receive signal and the optical transmit signal use different optical carrier wavelengths. The network port may, in this case, be connected to a diplex port of an optical diplexer. An output port of the respective transmitter unit may be connected to a first channel port of the optical diplexer and an input port of the respective receiver unit may be connected to a second channel port of the optical diplexer. In this way, the optical diplexer makes it possible to separate the common input/output path defined by the single optical fiber into an input path between the second channel port of the optical diplexer and the input port of the respective receiver unit and an output path between the output port of the respective transmitter unit and the first channel port of the optical diplexer.

According to a further embodiment, the control unit includes a buffer means for buffering data extracted from a western or eastern electrical receive signal before the data can be integrated into the eastern or western electrical transmit signal transmitted via the respective other port. This may be required if data are to be passed through from one network port to the other and if simultaneously different TDM schemes are used for the communication via the two network ports. Especially, if the signal received at the respective port uses a symmetric TDM scheme and the signal transmitted at the respective other port uses an asymmetrical TDM scheme, a relatively large buffer may be required.

A typical structure or substructure of a protected passive optical access network comprises at least
  a first star domain having a star structure, the first star domain comprising a first passive optical star coupling means having a predetermined number of optical ports for being connected to an optical network unit or an optical line terminal, at least one port being connected to a western optical network port of a first optical network unit having an optical network unit structure according to one of the preceding claims,
  a second star domain having a star structure, the second star domain comprising a second passive optical star coupling means having a predetermined number of optical ports for being connected to an optical network unit or an optical line terminal, at least one port being connected to an eastern optical network port of a second optical network unit having an optical network unit structure according to one of the preceding claims, and
  a linear domain having a linear structure, the linear structure consisting of at least two optical network units having an optical network unit structure as described above, the at least two optical network units being coupled in a chain-like manner, the linear domain including the first optical network unit as a first node and the second optical network unit as a last node.

As already mentioned above, the optical network units within the linear bus structure including the first and second optical network units preferably apply a symmetrical TDM (TDMS) scheme for communicating with each other and wherein the first and last optical network units apply an asymmetrical TDM (TDMA) scheme for communicating with a further optical network unit or an optical line terminal connected to another port of the respective first or second star domain.

Thus, the optical network unit structure according to the invention makes it possible to build up a meshed optical access network consisting of at least one optical line terminal and a plurality of respective optical network units, the network structure (exclusively) consisting of an arbitrary number of star domains and linear domains. If two optical line terminals are provided at the same location (these might also be integrated into one apparatus or equipment), the meshed network structure may be designed and operated such that a path protection between two communicating network units (ONU and/or OLT) is provided, the working path being terminated by either the eastern or western network port of the respective ONU and the protection path being terminated by the respective other network port.

Further embodiments of the invention are apparent from detailed description, drawings, and claims provided herein.

BRIEF DESCRIPTION OF THE DRAWINGS

In the following, preferred embodiments of the invention will be further described with reference to the drawings.

FIG. 4a is a schematic representation of the control logic of an ONU configured to use an asymmetrical TDM scheme at the western network port and a symmetrical TDM scheme at the eastern network port.

FIG. 4b is a schematic representation of the control logic of an ONU configured to use a symmetrical TDM scheme at both network ports.

DETAILED DESCRIPTION OF PROFFERED EMBODIMENTS

Figure 1:
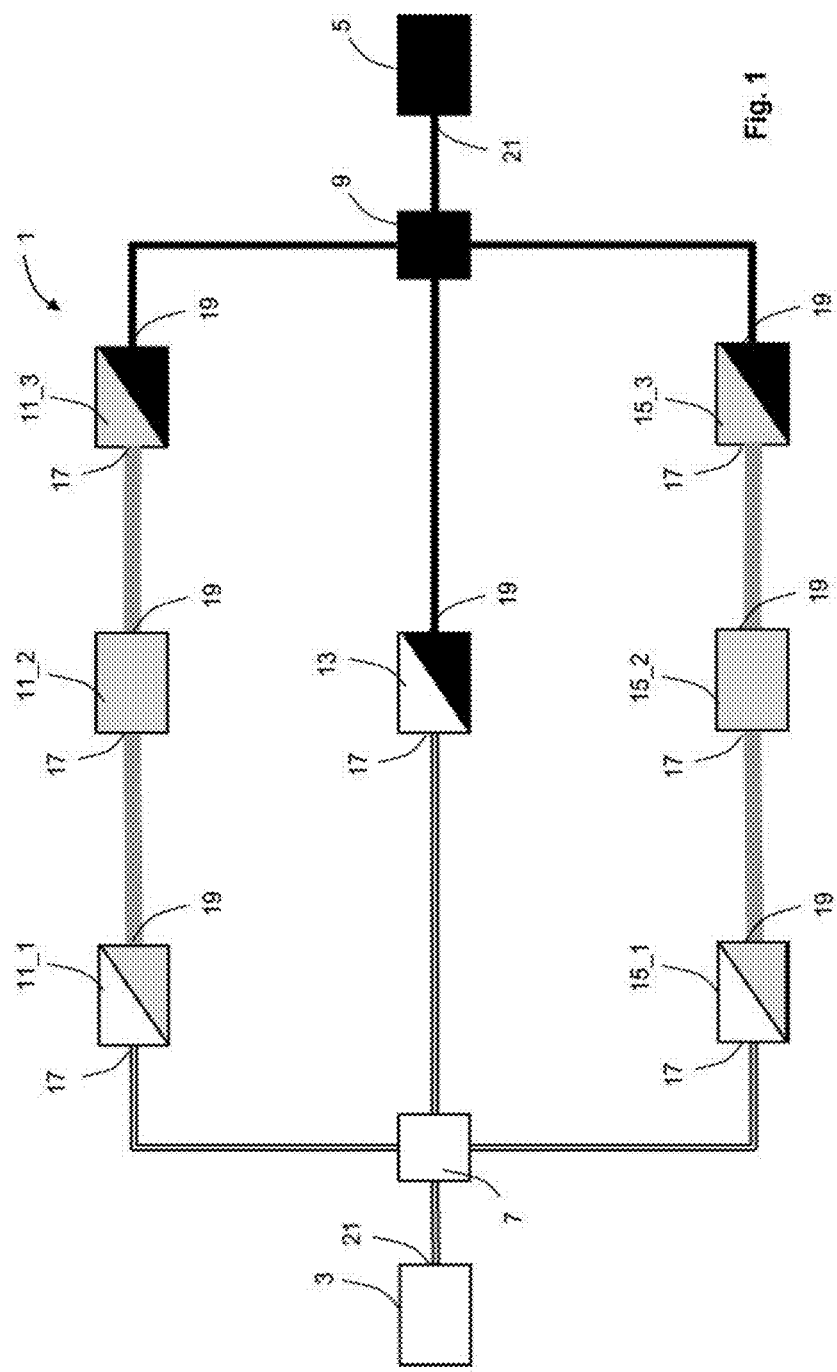
FIG. 1 is a schematic block diagram of an embodiment of a PON architecture according to the invention comprising two star domains and three linear domains.

FIG. 1 shows a schematic block diagram of a passive fiber-optic access network (PON) architecture 1 consisting of two central nodes or OLTs 3, 5, each being connected to an RN 7, 9 in the form of a star coupling means, for example a simple optical star coupler. Each depicted star coupling means 7 defines four ports. Three of the ports of the star coupling means 7 are connected to a respective western network port 17 of an ONU 11_1, 13 and 15_1, respectively. The fourth port of the star coupling means 7 is connected to a network port 21 of the OLT 3.

In the same manner, three of the ports of the star coupling means 9 are connected to a respective eastern network port 19 of an ONU 11_3, the ONU 13 and an ONU 15_3, respectively. The fourth port of the star coupling means 9 is connected to a network port 21 of the second OLT 5.

For connecting the respective ports of the components 3, 5, 7, 9, 11, 13 and 15, a single optical fiber is preferably used in the embodiment according to FIG. 1 carrying the traffic of the bidirectional communication link(s) in both directions. However, it is, of course, also possible to use a separate fiber for each direction of the communication, if the respective ports are realized as dual ports (one separate physical connecting means for each of the two connecting fibers).

The OLT 3, the star coupling means 7 and the ONUs 11_1, 13 and 15_1 define a first star domain visualized by the white color of the respective components. Similarly, the star coupling means 9 and the ONUs 11_3, 13 and 15_3 define a second star domain visualized by the black color of the respective components.

The three ONUs 11_1, 11_2 and 11_3 as well as the ONUs 15_1, 15_2 and 15_3 each define a linear domain, depicted by the grey color of the respective components, as the respective ONUs are connected in a linear chain-like structure.

The ONUs 11_1, 13, 15_1, 11_3 and 15_3 belong to both the respective linear and the respective star domain. This is symbolized by the respective two colors of these ONUs. The respective two domains, i.e., the star domain and the linear domain concerned, are connected by these ONUs.

For establishing a bidirectional communication, especially between a specified ONU and an OLT 3, 5, optical network transmit signals at a specific optical carrier wavelength or frequency are used. The (original) optical transmit signals at the end points of a transmission link are created by the ONU or the OLT concerned. The communication is effected by using TDM signals carried by the specific optical carrier wavelength.

Within a star domain, i.e. for establishing a communication between network units (ONUs or an OLT) directly connected to a network port of one of the star coupling means 5, 9, an asymmetrical TDM scheme (designated as TDMA scheme) is usually applied. This transmission scheme combines a data transmission scheme in the downstream path (from the OLT to a selected ONU) that uses a transmission signal including address data for addressing the selected unit (here, the selected ONU) with a data transmission scheme in the upstream path (from the selected ONU to the respective OLT) which uses dedicated time slots for "addressing" the data included within the respective time slot to the unit (OLT or ONU) the respective time slot has been associated with. Thus, it is possible to broadcast a signal from the OLT to all ONUs of the respective star domain, simply by using a broadcast address. The transmission signal in the downstream path may, for example, be a packet based signal.

The TDMA scheme that is used in the upstream path assures that only one single upstream signal (created by an ONU) at the same time arrives at the receiving unit (here, the OLT) in order to avoid signal interference at the receiving port of the receiving unit. This means that all ONUs of the respective star domain, apart from the ONU that is transmitting in the dedicated time slot, must shut off the optical transmitter element (usually a laser).

As the distance between various ONUs coupled to the respective star coupling means and the star coupling means itself may be different, it is known to use so-called guard banks (specified time intervals) between the time slots which limit the bandwidth efficiency of this transmission scheme.

Usually, the star coupling means 7, 9 realizing the RNs will be realized as directional coupling means. This means that the downstream signal created by an OLT 3, 5, which is supplied to a common port of the directional coupling means will be (in general equally) split into a given number of signals (by splitting the optical power of the incoming signal), each being output at one of the splitting ports of the star coupling means. Further, each signal fed to one of the splitting ports of the directional coupling means will be output at the common port, only.

Thus, each OLT 3, 5 may transmit an optical network transmit signal in the downstream path independently from the optical network transmit signals being created by one of the ONUs 11_1, 13, 15_1 connected to a splitting port of the (directional) star coupling means 7 or by one of the ONUs 11_3, 13, 15_3 connected to a splitting port of the (directional) star coupling means 9, respectively.

In a more complex alternative, the star coupling means 7, 9 may be realized as fully symmetrical star couplers with a given number N of symmetrical ports. Here, not only the network transmit signal created by an OLT 3, 5 is (preferably equally) split into N−1 signals but also any network transmit signal created by any of the ONUs 11_1, 13, 15_1 or 11_3, 13, 15_3 connected to the respective fully symmetrical star coupling means 7, 9. This, of course, requires that only one of the network units, i.e. an OLT 3, 5 or an ONU 11_1, 13, 15_1 or 11_3, 13, 15_3 attached to the symmetrical ports, creates a network transmit signal if these signals use identical optical carrier wavelengths, as otherwise the split signals, which are received as network receive signal at the respective ports of the other network units, would interfere. The advantage of this alternative is that an ONU connected to the symmetrical star coupling means could communicate not only with the respective OLT but also with one of the other ONUs of this star domain (which, in turn, could, of course also communicate with a respective further neighboring ONU of the respective neighboring domain).

This interference problem could be avoided if the OLTs 3, 5 use a carrier wavelength for the transmit signals transmitted in the downstream direction (i.e., the direction from the respective OLT 3, 5 to the respective star coupling means 7, 9) different from the carrier wavelength used by the ONUs attached to the other symmetrical ports of the symmetrical star coupling means. This enables the ONUs to block network receive signals having the same carrier wavelength as used by the ONUs for creating the upstream network transmit signal and to receive only network receive signals having the carrier wavelength as used by the OLT.

The communication within the linear domains is based on a usual symmetric TDM data transmission scheme. This means that the ONUs within a linear domain transmit optical TDM signals in the upstream direction. The data created (not only forwarded) by a specific ONU are included within a time slot dedicated to the respective ONU. In order to make the transmission along the chain within a linear domain possible, each ONU receiving a signal at one of the network ports 17, 19 that is addressed to the OLT (or, as the case may be, to another ONU) which is located at a position "beyond" the respective ONU, converts the optical signal received into an electrical receive signal, if necessary (or at any rate), effects a signal processing (especially a signal recovery) of the electrical receive signal, and re-converts it into an optical transmit signal that is transmitted to the next ONU (in the same direction). Of course, this is necessary within non-dedicated time slots, only. Within the time slot dedicated to the respective ONU, the ONU may include data provided from at least one local port 23 (FIG. 2, 3) into the network transmit signal that is output at a selected network port, i.e. either the eastern or the western port.

Alternatively, it is also possible to output the signal created at a selected ONU at both network ports so that the signal is transmitted in both directions. This may serve to transmit an identical signal over a protection path (see explanations below).

As the ONUs within a linear domain are coupled in a chain-like manner and a signal recovery may be effected at each ONU, practically no restrictions as to the length of the chain exist.

Figure 2:
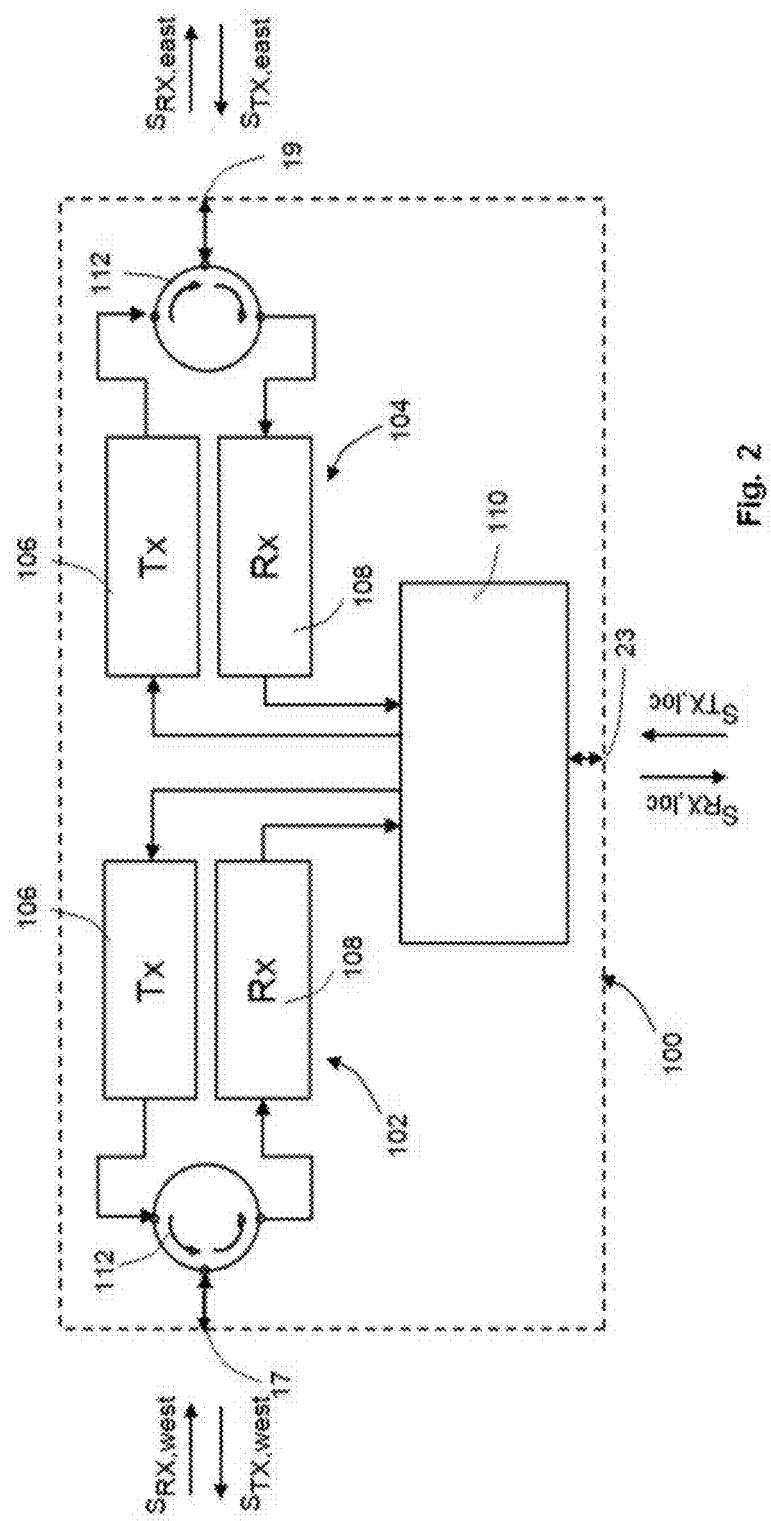
FIG. 2 is a schematic block diagram of a first embodiment of an ONU according to the invention adapted to bidirectionally communicate with an OLT or another ONU connected to each of the two optical network ports using optical transmit and receive signals having the same optical carrier wavelength.

FIG. 2 shows a first embodiment of an optical network unit (ONU) structure 100 suitable to realize an ONU 11, 13, 15. The ONU structure 100 comprises a western and an eastern transceiver unit 102, 104, each comprising a transmitter unit 106 and a receiver unit 108. The transmitter units 106 receive a western and eastern electrical network transmit signal $S_{TX,el,west}$, $S_{TX,el,east}$ (as detailed in FIGS. 4*a-d*) respectively, from a control unit 110 and convert the respective signal into a western and eastern optical network transmit signal $S_{TX,west}$, $S_{TX,east}$, respectively, each of which is supplied to an optical circulator 112. The optical circulators 112 forward the western and eastern optical network transmit signal $S_{TX,west}$, $S_{TX,east}$ to the western and eastern network port 17, 19, respectively.

A western and eastern optical network receive signal $S_{RX,west}$, $S_{RX,east}$ received at the western or eastern network port 17, 19 is supplied to the respective optical circulator 112 which directs the respective network receive signal to the respective receiver unit 108. The receiver units 108 convert the western and eastern optical network receive signal $S_{RX,west}$, $S_{RX,east}$, respectively, into a western and eastern electrical network receive signal, respectively, that are supplied to the control unit 110.

The control unit 110 is adapted to do all necessary signal processing (including signal recovery). The control unit is further adapted to receive a local transmit signal $S_{TX,local}$ at the local port 23 and to integrate or insert the data according to the local transmit signal $S_{TX,local}$ into the western and/or eastern electrical network transmit signal $S_{TX,el,west}$, $S_{TX,el,east}$, respectively. The control unit 110 is further adapted to extract the information or data included within the western and/or eastern optical network receive signal $S_{RX,west}$, $S_{RX,east}$ addressed to the respective ONU 11, 13, 15 and to integrate this information or these data into a local receive signal $S_{RX,local}$ that is output at the local port 23. Of course, the electrical local signals may again be converted into respective optical signals.

The control unit 23 applies the suitable symmetrical (designated as TDMS) or TDMA scheme (see the above explanations) in order to create the western and eastern optical network transmit signal $S_{TX,west}$, $S_{TX,east}$, respectively, and to receive the western and eastern optical network receive signal $S_{RX,west}$, $S_{RX,east}$, respectively.

The portion or content of the TDM receive signal $S_{RX,west}$, $S_{RX,east}$ that is not addressed to the respective ONU is forwarded to the respective other port.

For this purpose, the control unit 23 may comprise a buffer means in order to buffer the data extracted from a TDM signal received. This might be necessary if the TDM scheme applied for the communication via the receiving network port 17, 19 defines a higher bit rate than the TDM scheme that is applied for the TDM signal to be transmitted via the respective other network port 19, 17.

Buffering may especially be necessary if the information or data to be forwarded over the respective ONU is received via an optical TDM network receive signal applying a TDMS scheme, and a TDMA scheme is applied for communicating via the respective other network port.

The transport of the information or data within the TDM signals may be effected by using data packets or so-called virtual containers (VC). In order to create a TDM signal by integrating data or information received at the local port 23, the data may be wrapped in suitable packets or VC that may directly be integrated within the respective TDM signal applying a TDMS or a TDMA scheme. Wrapping data in suitable packets or VC and extracting packets or VC from a network receive signal may be effected by a specific software designated as VC client.

Figure 3:
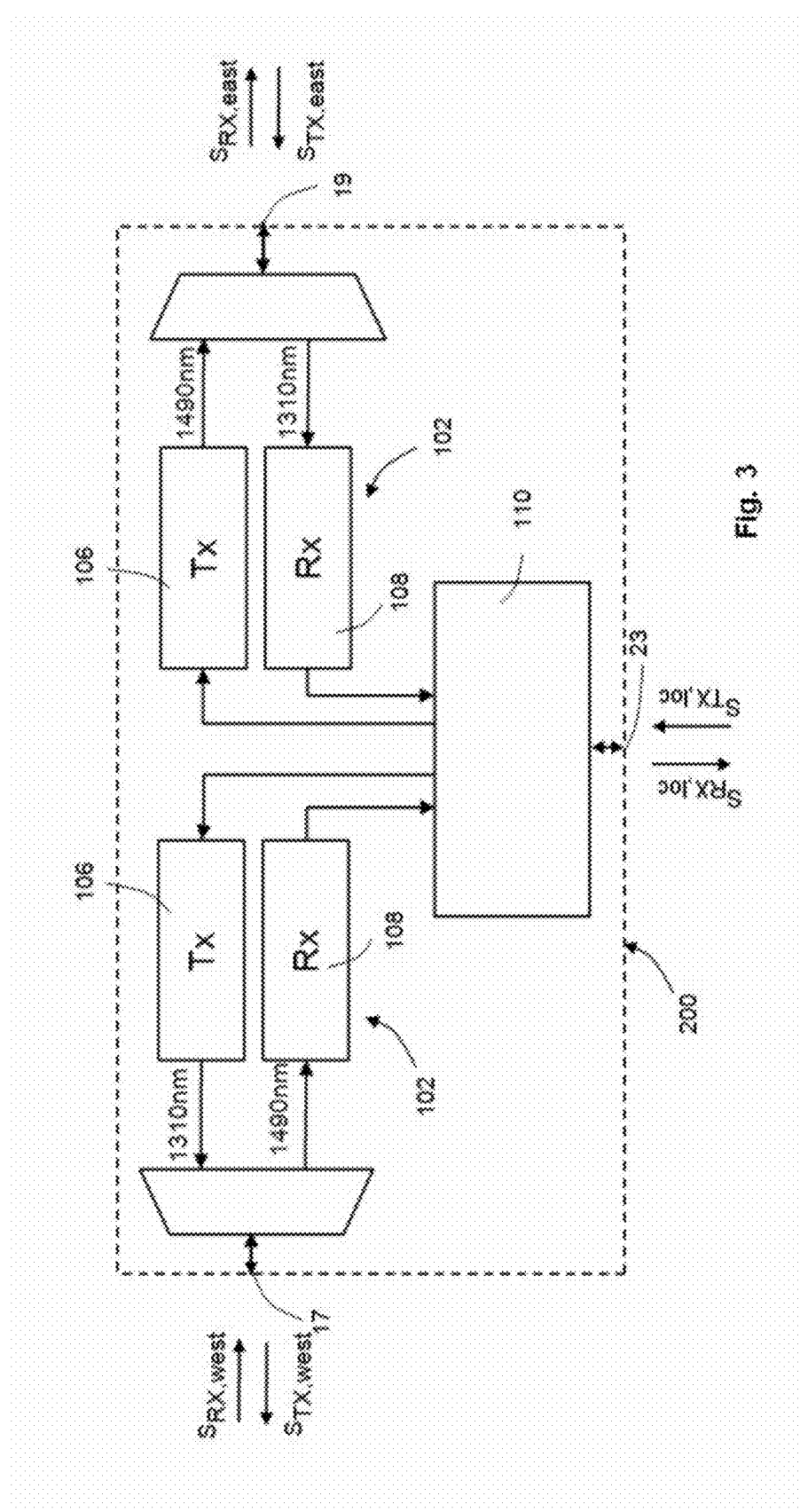
FIG. 3 is a schematic block diagram of a second embodiment of an ONU according to the invention adapted to bidirectionally communicate with an OLT or another ONU connected to each of the two optical network ports using optical transmit and receive signals having different optical carrier wavelengths.

The logical functional structure of an ONU 11, 13, 15 having the schematic physical structure shown in FIG. 2 or 3 is visualized in FIGS. 4*a-d*. The respective functionality is included within the control unit 110, mostly by a suitable software or firmware.

FIG. 4*a* is a schematic representation of the control logic of an ONU configured to use an asymmetrical TDM scheme at the western network port and a symmetrical TDM scheme at the eastern network port.

FIG. 4*b* is a schematic representation of the control logic of an ONU configured to use a symmetrical TDM scheme at both network ports.

Figure 4D:
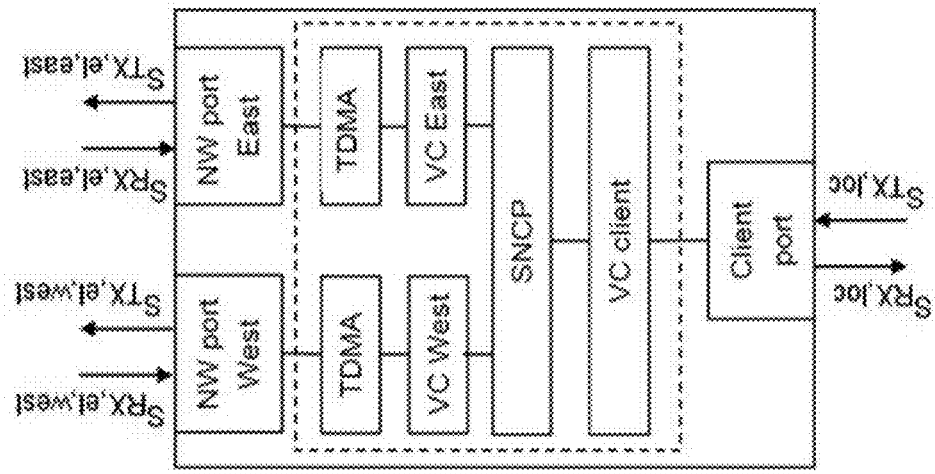
FIG. 4d is a schematic representation of the control logic of an ONU configured to use an asymmetrical TDM scheme at both network ports.
Figure 4C:
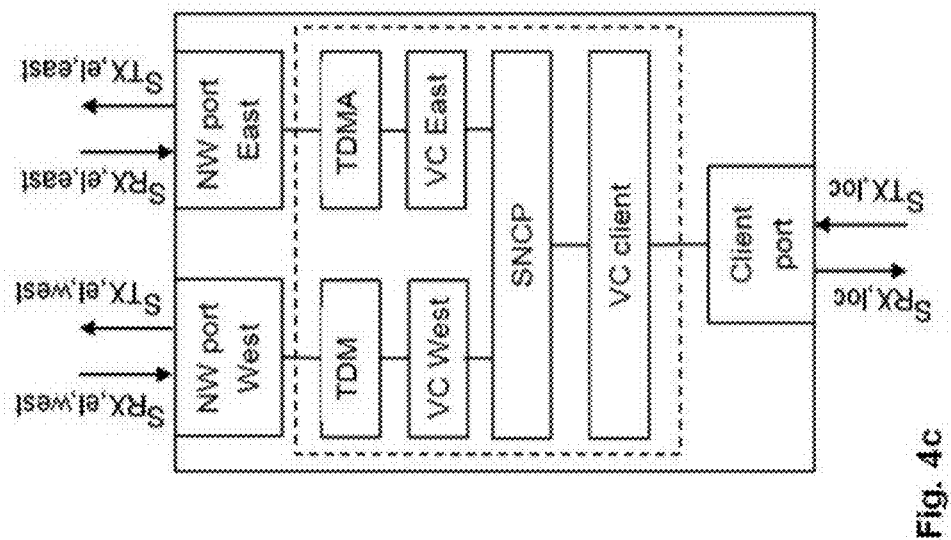
FIG. 4c is a schematic representation of the control logic of an ONU configured to use a symmetrical TDM scheme at the western network port and an asymmetrical TDM scheme at the eastern network port.

FIG. 4c is a schematic representation of the control logic of an ONU configured to use a symmetrical TDM scheme at the western network port and an asymmetrical TDM scheme at the eastern network port.

FIG. 4d is a schematic representation of the control logic of an ONU configured to use an asymmetrical TDM scheme at both network ports.

As explained above, the VC client processes the TDM signal received by extracting the VCs and either forwarding the VCs to the respective other port or by supplying the VCs to the local port (designated as client port). Further, the VC client wraps the locally received data into VCs, which are then integrated within the respective TDM signal.

The VCs extracted from and to be integrated into a respective TDM signal join a common subnetwork connection (SCNP) scheme which is used in a synchronous digital hierarchy (SDH) network. However, the versions shown in FIGS. 4a-d are to be understood as an example only, and the invention is not restricted to SDH networks.

The SNCP scheme may be designed such that the information to be sent from the respective ONU is transmitted either via the western network port or via the eastern network port. If, for example, a communication between the ONU 15_2 and the OLT 3 is to be established, the SCNP scheme may be designed such that the shorter path via the western network port 17 is defined as a working path. In case of a failure within the working path, the SCNP switches to the eastern network port 19 and establishes a communication with the OLT 5. If the OLT 5 is not present at the same location as the OLT 3, a further communication path between the OLT 5 and the OLT 3 must be established in order to provide the desired path protection. This may be effected by means of further network domains between the OLT 5 and the OLT 2 (not shown in the Figures).

Alternatively, the SNCP may be designed such that identical signals created at the respective ONU (e.g., ONU 15_2) are forwarded to both the eastern and western network port 17, 19 simultaneously, which are forwarded via the working path and the protection path, respectively, to the desired end point (e.g. the OLT 3). The network unit defining the end point (e.g. the OLT 3) may then decide whether the signal transported via the working path or the signal transported via the protection path is chosen as receive signal.

In order to decide which path shall be used as a protection path, the control unit 110 may store topology information which characterizes the network or subnetwork in which the respective ONU is located. This topology information may be gathered by the ONU or transmitted to the ONU within an initialization procedure when an ONU is integrated into a network or subnetwork. The ONU may comprise a storage (not shown in the Figures) for storing the topology information.

FIG. 3 shows a further embodiment of an optical network unit (ONU) structure 200 that may be used for realizing an ONU 11, 13, 15. The structure 200 is largely identical with the structure according to FIG. 2, but deviates from the structure shown in FIG. 2 in that instead of optical circulators, optical diplexers 212 are used in order to separate the optical paths for the optical network transmit signals $S_{TX,west}$, $S_{TX,east}$ and the optical network receive signals $S_{RX,west}$, $S_{RX,east}$. Thus, the structure 200 is suitable for building up a network or subnetwork in which different optical carrier wavelengths are used for the upstream and downstream direction, whereas the structure shown in FIG. 2 is suitable for networks or subnetworks using the same wavelength for the upstream and downstream paths. As shown in FIG. 3, a wavelength of 1490 nm is used in the path from west to east and a wavelength of 1310 nm is used in the path from east to west.

As apparent from the above explanations, the optical network unit structure according to the invention reveals a high degree of flexibility as corresponding ONUs may not only be used in networks or subnetworks that use a TDMS or TDMA scheme but also as network unit at the borders of two neighboring networks or subnetworks that use different TDM schemes, irrespective of whether a TDMS or TDMA scheme is used in the neighboring networks. Further, the structure makes it possible to establish a protection mechanism.

Of course, the invention is not restricted to the simple example of a meshed network as shown in FIG. 1. It also covers any arbitrary meshed network structure that may be divided into an arbitrary number of star domains and linear domains. For example, instead of directly connecting the OLTs 3, 5 to a port of the respective star coupling means 7, 9, a linear domain including a chain of ONUs may be present between the respective port of the star coupling means 7, 9 and the respective OLT 3, 5. Also, instead of simple linear domains between the star domains, more complicated structures may be present including further star domains. This allows to set up almost arbitrarily meshed networks in order to connect a plurality of ONUs to an OLT.

As used herein, whether in the above description or the following claims, the terms "comprising," "including," "carrying," "having," "containing," "involving," and the like are to be understood to be open-ended, that is, to mean including but not limited to.

Any use of ordinal terms such as "first," "second," "third," etc., in the claims to modify a claim element does not by itself connote any priority, precedence, or order of one claim element over another, or the temporal order in which acts of a method are performed. Rather, unless specifically stated otherwise, such ordinal terms are used merely as labels to distinguish one claim element having a certain name from another element having a same name (but for use of the ordinal term).

The above described preferred embodiments are intended to illustrate the principles of the invention, but not to limit the scope of the invention. Various other embodiments and modifications to these preferred embodiments may be made by those skilled in the art without departing from the scope of the present invention.

LIST OF REFERENCE SIGNS 1 passive fiber-optic access network (PON) architecture
3 central node (OLT)
5 central node (OLT)
7 remote node (RN), star coupling means
9 remote node (RN), star coupling means
11 optical network unit (ONU) (11_1 to 11_3)
13 optical network unit (ONU)
15 optical network unit (ONU) (15_1 to 15_3)
17 western network port (of an ONU)
19 eastern network port (of an ONU)
21 network port (of an OLT)
23 local port (of an ONU)
100 optical network unit structure
102 western transceiver unit
104 eastern transceiver unit
106 transmitter unit
108 receiver unit 110 control unit
112 optical circulator
200 optical network unit structure
212 optical diplexer
$S_{TX,el,west}$, $S_{TX,el,east}$ western, eastern electrical network transmit signal
$S_{RX,el,west}$, $S_{RX,el,east}$ western, eastern electrical network receive signal
$S_{TX,west}$, $S_{TX,east}$ western, eastern optical network transmit signal
$S_{RX,west}$, $S_{RX,east}$ western, eastern optical network receive signal $S_{TX,local}$ local transmit signal $S_{RX,local}$ local receive signal

The invention claimed is:

1. An optical network unit for use in a protected passive optical access network having a meshed structure including at least two central nodes and a plurality of optical network units, the optical network unit comprising:
   (a) a western network port and an eastern network port adapted to receive a western or eastern optical network receive signal, respectively, and to output an eastern or western optical network transmit signal, respectively, the receive and transmit signals having a time division multiplex structure;
   (b) at least one local port adapted to receive a local transmit signal to be transmitted to the network and to output a local receive signal extracted from the western or eastern optical network receive signal;
   (c) a western and an eastern receiver unit adapted to receive the western or eastern optical network receive signal from the respective western or eastern network port, respectively, and to convert the respective received western or eastern optical network receive signal into an electrical network receive signal;
   (d) a western and an eastern transmitter unit adapted to receive a western or an eastern electrical network transmit signal, respectively, and to convert the respective received western or eastern electrical network transmit signal into the respective eastern or western optical network transmit signal, and
   (e) a control unit adapted to provide a selectable bidirectional communication between the at least one local port and an additional optical network unit via either the western or the eastern network port and to provide a pass-through communication between the western and eastern network ports by processing the electrical network receive signals and the local transmit signal and by creating the local receive signal and the western and eastern electrical network transmit signals in a format selectable as either a symmetric time division multiplex transmission scheme or an asymmetrical time division multiplex transmission scheme, the time division multiplex transmission scheme for the western electrical network receive and transmit signals being independently selectable from the time division multiplex transmission scheme for the eastern electrical network receive and transmit signals.

2. The optical network unit of claim 1, wherein the control unit is configured to use network topology information to decide which time division multiplex transmission scheme is applied for a respective communication via the western or eastern network port.

3. The optical network unit of claim 2, wherein the control unit includes a storage area adapted to store the network topology information, the network topology information including at least information whether at least one of the western and the eastern network ports is directly connected to a port of a passive optical star coupling means or to a network port of a further optical network unit.

4. The optical network unit of claim 3, wherein the control unit is configured to apply a symmetrical time division multiplex transmission scheme for processing the signals received from and transmitted via the respective eastern or western network port, if the respective network port is directly connected to a port of a passive optical star coupling means, and wherein the control unit is configured to apply an asymmetrical time division multiplex transmission scheme for processing the signals received from and transmitted via the respective eastern or western network port, if the respective network port is directly connected to a network port of a further optical network unit.

5. The optical network unit of claim 1, wherein the eastern or western network port is adapted to being connected to a single optical fiber employed for the bidirectional communication with the additional optical network unit; and
   (a) wherein the optical network receive signal and the optical network transmit signal use the same optical carrier wavelength, the respective network port being connected to a first port of an optical circulator, an output port of the respective transmitter unit being connected to a second port of the optical circulator and an input port of the respective receiver unit being connected to a third port of the optical circulator, the optical circulator making it possible to separate the common input/output path defined by the single optical fiber into an input path between the third port of the optical circulator and the input port of the respective receiver unit and an output path between the output port of the respective transmitter unit and the second port of the optical circulator;
   or
   (b) wherein the optical network receive signal and the optical network transmit signal use different optical carrier wavelengths, the respective network port being connected to a diplex port of an optical diplexer, an output port of the respective transmitter unit being connected to a first channel port of the optical diplexer and an input port of the respective receiver unit being connected to a second channel port of the optical diplexer, the optical diplexer operable to separate the common input/output path defined by the single optical fiber into an input path between the second channel port of the optical diplexer and the input port of the respective receiver unit and an output path between the output port of the respective transmitter unit and the first channel port of the optical diplexer.

6. The optical network unit of claim 5, wherein the control unit comprises a buffer means for buffering data extracted from a respective western or eastern electrical network receive signal received at the western or eastern network port before the data can be integrated into the eastern or western electrical network transmit signal transmitted via the respective other network port.

7. The optical network unit of claim 6, wherein the respective western or eastern electrical network receive signal received at the western or eastern network port employs a symmetrical time division multiplex transmission scheme and wherein the eastern or western electrical network transmit signal transmitted via the respective other network port employs an asymmetrical time division multiplex transmission scheme.

8. A protected passive optical access network comprising:
   (a) a first star domain having a star structure, the first star domain comprising a first passive optical star coupling means having a predetermined number of optical ports for connecting an optical network unit or an optical line terminal, at least one optical port being connected to a western optical network port of a first optical network unit having an optical network unit structure including eastern and western transceiver units connected respectively to eastern and western optical network ports, a local port, and a controller operable to downlink a received signal to the local port from either optical port, uplink a transmit signal from the local port to either optical port, and operate both optical ports with a respective time division multiplex transmission scheme independently selectable as either a symmetric time division multiplex transmission scheme or an asymmetrical time division multiplex transmission scheme;

(b) a second star domain having a star structure, the second star domain comprising a second passive optical star coupling means having a predetermined number of optical ports for being connected to an optical network unit or an optical line terminal, at least one optical port being connected to an eastern optical network port of a second optical network unit having the optical network unit structure described in (a); and (c) a linear domain having a linear structure, the linear structure including at least two optical network units having the optical network unit structure described in (a), the at least two optical network units being coupled in a chain-like manner, the linear domain comprising the first optical network unit as a first node and the second optical network unit as a last node.

9. The passive optical access network of claim 8, wherein the optical network units within the linear structure including the first and second optical network units apply a symmetrical time division multiplex transmission scheme for communicating with each other and wherein the first and second optical network units apply an asymmetrical time division multiplex transmission scheme for communicating with a further optical network unit or an optical line terminal connected to another port of the respective first or second passive optical star coupling means.

10. The passive optical access network of claim 9, wherein a protection mechanism is provided enabling an optical network unit having the optical network unit structure described in (a) to communicate with a further optical network unit or an optical line terminal by transmitting an optical network transmit signal and receiving an optical network receive signal via either the western or the eastern optical network port.

11. The passive optical access network of claim 10, wherein a preferred route between the western or eastern optical network port of the optical network unit and the further optical network unit or the optical line terminal is used as a working route and wherein another route between the respective other optical network port of the optical network unit and the further optical network unit or the optical line terminal is used as a protection route.

* * * * *